(12) United States Patent
Nakao et al.

(10) Patent No.: US 8,500,856 B2
(45) Date of Patent: Aug. 6, 2013

(54) HYBRID ADSORBENT METHOD OF CAPTURING CARBON DIOXIDE IN GAS AND APPARATUS FOR CAPTURING CARBON DIOXIDE IN GAS

(75) Inventors: Kenji Nakao, Tokyo (JP); Kimihito Suzuki, Tokyo (JP); Kenichiro Fujimoto, Tokyo (JP); Hatsuo Taira, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 95 days.

(21) Appl. No.: 13/318,719

(22) PCT Filed: May 10, 2010

(86) PCT No.: PCT/JP2010/003163
§ 371 (c)(1),
(2), (4) Date: Nov. 3, 2011

(87) PCT Pub. No.: WO2010/128599
PCT Pub. Date: Nov. 11, 2010

(65) Prior Publication Data
US 2012/0048111 A1    Mar. 1, 2012

(30) Foreign Application Priority Data
May 8, 2009  (JP) .................. P2009-113817

(51) Int. Cl.
*B01D 53/02*    (2006.01)
(52) U.S. Cl.
USPC ............. 95/139; 95/148; 96/108; 96/134

(58) Field of Classification Search
USPC ................. 95/139, 148; 96/108, 134
See application file for complete search history.

(56) References Cited

U.S. PATENT DOCUMENTS

| 4,312,641 | A   |   | 1/1982 | Verrando et al. |
| 6,379,435 | B1  | * | 4/2002 | Fukunaga et al. .............. 96/111 |
| 7,404,840 | B2  | * | 7/2008 | Wood et al. ..................... 55/523 |
| 7,513,921 | B1  | * | 4/2009 | Phelps et al. ................. 55/282.3 |
| 2005/0184062 | A1 |   | 8/2005 | Kobayashi et al. |

FOREIGN PATENT DOCUMENTS

| DE | 19703068 A1 | 7/1998 |
| EP | 1491256 A1 | 12/2004 |
| JP | 51-43394 A | 4/1976 |
| JP | 57-184435 A | 11/1982 |
| JP | 62-163725 A | 7/1987 |

(Continued)

OTHER PUBLICATIONS

International Preliminary Report on Patentability (Form PCT/IPEA/409) and (Form PCT/IPEA/416) for PCT/JP2010/003163, mailed Apr. 19, 2011, including an English translation of Form PCT/IPEA/409.

(Continued)

*Primary Examiner* — Christopher P Jones
(74) *Attorney, Agent, or Firm* — Birch, Stewart, Kolasch & Birch, LLP

(57) ABSTRACT

In a method of capturing carbon dioxide in a gas, carbon dioxide in a gas is adsorbed to the hybrid adsorbent prepared by mixing an adsorbent with iron oxide nanoparticles, microwaves are irradiated to the hybrid adsorbent and the carbon dioxide adsorbed to the hybrid adsorbent is desorbed from the hybrid adsorbent, and the carbon dioxide desorbed from the hybrid adsorbent is captured.

9 Claims, 2 Drawing Sheets

FOREIGN PATENT DOCUMENTS

| | | |
|---|---|---|
| JP | 6-293501 A | 10/1994 |
| JP | 10-305207 A | 11/1998 |
| JP | 2003-70887 A | 3/2003 |
| JP | 2004-202393 A | 7/2004 |
| JP | 2004-344703 A | 12/2004 |
| JP | 2006-159102 A | 6/2006 |
| JP | 2006-240966 A | 9/2006 |
| JP | 2008-273821 A | 11/2008 |
| JP | 2009-82888 A | 4/2009 |
| WO | WO 03/080237 A1 | 10/2003 |

OTHER PUBLICATIONS

International Search Report (Form PCT/ISA/210) for PCT/JP2010/003163, mailed Jul. 27, 2010, including English translations.

Kawai et al., "Chemical Apparatus," vol. 31, No. 8, Aug. 1989, pp. 54-59, including partial English translation.

Wakamura et al., "Development of PSA Type Equipment for Generating Carbon Dioxide from Combustion Waste Gas," Nippon Steel Technical Report, No. 345, 1992, pp. 55-58, including a partial English translation.

\* cited by examiner

HYBRID ADSORBENT METHOD OF CAPTURING CARBON DIOXIDE IN GAS AND APPARATUS FOR CAPTURING CARBON DIOXIDE IN GAS

FIELD OF THE INVENTION

The present invention relates to a hybrid adsorbent and a method of separating and capturing carbon dioxide from a carbon dioxide-containing gas, such as a blast furnace gas or a combustion exhaust gas, using the hybrid adsorbent.

Priority is claimed on Japanese Patent Application No. 2009-113817, filed May 8, 2009, the content of which is incorporated herein by reference.

DESCRIPTION OF RELATED ART

Recently, it is desirable to perform effective measures early to prevent global warming. The carbon dioxide in the atmosphere is a main component of greenhouse effect gases causing global warming. Accordingly, when it is possible to separate and capture carbon dioxide in a combustion exhaust gas discharged from a heat power plant or the like and a blast furnace gas of iron works and stabilize or effectively use the carbon dioxide, it may be considered as being able to suppress global warming to a great extent.

As a method of separating and capturing carbon dioxide from a carbon dioxide-containing gas, a chemical absorption method using an amine-based absorbing solution and a physical adsorption method using an adsorbent have been in practical use.

The chemical absorption method using amine was in the 1930s and used in practice in urea synthesis plants. However, as disclosed in Patent Citation 1, when an aqueous solution of alkanolamine, such as monoethanolamine, is used as absorbing solution, since the apparatus is easily corroded by the aqueous solution, an apparatus made of expensive corrosion-resistant steel is required. Further, in Patent Citation 1, high energy is required to desorb carbon dioxide from the absorbing solution.

In an adsorption method using activated carbon or zeolite as an adsorbent, a pressure swing adsorption (PSA) that desorbs carbon dioxide from an adsorbent by reducing pressure with a vacuum pump has been used in small-scale apparatuses. The PSA method, as disclosed in Non-Patent Citation 1, has the merit that an anticorrosion measure is not necessary, which is necessary in the chemical absorption method, because the PSA method is a dry method. However, the PSA method has a defect that high energy is required to desorb carbon dioxide using a vacuum pump. Further, as disclosed in Non-Patent Citation 2, when a large-scale apparatus is used, the layer thickness of a packed layer in the apparatus is large, such that pressure loss $\Delta P$ is large when carbon dioxide is desorbed. Therefore, the degree of vacuum (several kPa) which is required for the upper portion of the layer is not reached and the amount of captured carbon dioxide is reduced. Further, a high-performance vacuum pump is needed to ensure the vacuum required for the upper portion of the layer. There is a problem in this case that the energy required for desorbing carbon dioxide further increases.

A method of bringing discharged carbon in contact with a gas for activating activated carbon, such as vapor, under heating with microwaves when reproducing the activated carbon which is discharged by being used in water treatment, such as industrial wastewater treatment, domestic wastewater treatment, and purification of water, recovery of solvents, or purification of air, has been disclosed in Patent Citation 2. However, desorbing carbon dioxide is not disclosed and a method of irradiating microwaves is also not disclosed in detail.

As disclosed in Patent Citation 3, the inventors have discovered a method that makes it possible to reduce energy consumption in comparison to the conventional methods, by irradiating microwaves when desorbing carbon dioxide from an adsorbent that is used in a physical adsorption method, as a technology of separating and capturing carbon dioxide from a gas. It is disclosed in Patent Citation 3 that zeolite, activated carbon, or a compound of zeolite and activated carbon is useful for the adsorbent.

Patent Citation

[Patent Citation 1] Japanese Unexamined Patent Application, First Publication No. 2006-240966
[Patent Citation 2] Japanese Unexamined Patent Application, First Publication No. S51-43394
[Patent Citation 3] Japanese Unexamined Patent Application, First Publication No. 2008-273821

Non-Patent Citation

[Non-Patent Citation 1] Toshinaga KAWAI and Kenichiro SUZUKI: Chemical Apparatus Vo. 31(8), p. 54 (1989).
[Non-Patent Citation 2] Osamu WAKAMURA, Kentaro SHIBAMURA, and Kiyoshi UENOYAMA: Nippon Steel Technical Report No. 345, p. 55 (1992).

SUMMARY OF THE INVENTION

Problems to be Solved by the Invention

As described above, in methods of separating and capturing carbon dioxide by physical adsorption using an adsorbent, as a method of desorbing adsorbed carbon dioxide from an adsorbent, the pressure swing adsorption (PSA) of desorbing carbon dioxide from an adsorbent by reducing pressure in a system (packed layer) is commonly used. However, the PSA method is not suitable for large-scale works, due to the problem described above. Further, a thermal swing adsorption (TSA) of increasing temperature in a system (packed layer) may be considered as the method of desorbing carbon dioxide from an adsorbent. In the TSA method, an adsorbent is heated by heated carbon dioxide, the adsorbed carbon dioxide is desorbed from the adsorbent, the adsorbent is cooled by a gas, such as low-temperature nitrogen or air, and then the carbon dioxide is adsorbed by supplying carbon dioxide-containing gas. In the TSA method, the increase and decrease in temperature basically depends on heat transfer between a gas and a solid (adsorbent). Accordingly, there is a problem in the TSA method in that it takes longer time to desorb carbon dioxide, as compared with the PSA method.

The inventors thought that it is possible to more efficiently desorb carbon dioxide from an adsorbent in comparison to PSA method if it is possible to increase/decrease temperature for a short amount of time in the TSA method, considering the problems in the conventional techniques. Further, the inventors found that it is possible to efficiently desorb carbon dioxide by irradiating microwaves when desorbing the carbon dioxide, as a result of continuous studies (see Patent Citation 3). However, it is necessary to increase the amount of captured carbon dioxide by further reducing the energy required for desorbing carbon dioxide in order to further reduce the cost for capturing the carbon dioxide.

Therefore, it is an object of the present invention to provide a method of capturing carbon dioxide in a gas which can reduce energy consumption in comparison to the methods of the conventional techniques, when desorbing carbon dioxide from an adsorbent in accordance with a physical adsorption method.

Methods for Solving the Problem

The inventors thought that it was possible to solve the problems using a hybrid adsorbent prepared by mixing a substance that can more easily absorb microwaves into an adsorbent, as an adsorbent that can further reduce a specific energy consumption for capturing carbon dioxide. The inventors found that iron oxide nanoparticles are effective as a result of intensively studying the substance. That is, the inventors found that it is possible to desorb carbon dioxide with lower energy using the hybrid adsorbent prepared by mixing the iron oxide nanoparticles into an adsorbent, such that it is possible to increase the amount of captured carbon dioxide.

The technical term of "specific energy consumption for capturing carbon dioxide" used herein implies the amount of energy that is required to capture carbon dioxide of unit mass (for example, 1 kg). That is, the specific energy consumption for capturing carbon dioxide is calculated by converting the amount of power of the irradiated microwaves into consumed power and dividing the consumed power by the mass of the carbon dioxide.

The summary of the present invention is as follows.

(1) A hybrid adsorbent according to an aspect of the present invention includes: an adsorbent that adsorbs carbon dioxide; and iron oxide nanoparticles that have an average particle diameter of 10 to 500 nm.

(2) The mixing amount of the iron oxide nanoparticles may be 0.1 to 50 mass %, in the hybrid adsorbent according to (1).

(3) The average particle diameter of the iron oxide nanoparticles may be 20 to 200 nm, in the hybrid adsorbent according to (1).

(4) The average particle diameter of the adsorbent may be 0.5 to 50 µm, in the hybrid adsorbent according to (1).

(5) The iron oxide nanoparticles may contain at least one of magnetite, hematite, and wustite in the hybrid adsorbent according to (1).

(6) The iron oxide nanoparticles may be magnetite in the hybrid adsorbent according to (5).

(7) The adsorbent may contain at least one of activated carbon and crystalline zeolite in the hybrid adsorbent according to (1).

(8) The adsorbent may be crystalline zeolite expressed by a chemical formula, $Na_{86}[(AlO_2)_{86}(SiO_2)_{106}].276H_2O$, in the hybrid adsorbent according to (7).

(9) The hybrid adsorbent according to (1) may be formed by a bonding material and used.

(10) A method of capturing carbon dioxide in a gas according to another aspect of the present invention includes: adsorbing carbon dioxide in a gas on the hybrid adsorbent of any one of (1) to (9); irradiating microwaves to the hybrid adsorbent and desorbing the carbon dioxide adsorbed on the hybrid adsorbent from the hybrid adsorbent; and capturing the carbon dioxide desorbed from the hybrid adsorbent.

(11) An apparatus for capturing carbon dioxide in a gas according to another aspect of the resent invention includes: a first passage in which a gas containing a carbon dioxide is introduced; an adsorption tower which has a packed layer filled with the hybrid adsorbent according to any one of (1) to (9); a microwave generator which irradiates microwaves to the hybrid adsorbent; a product tank in which the carbon dioxide is captured; a second passage in which a cooling gas cooling the hybrid adsorbent is introduced.

Effects of the Invention

According to the method of capturing carbon dioxide in a carbon dioxide-containing gas of the present invention, it is possible to separate and capture carbon dioxide from a carbon dioxide-containing gas, more efficiently and at lower cost than the conventional techniques.

DETAILED DESCRIPTION OF THE INVENTION

Figure 1:
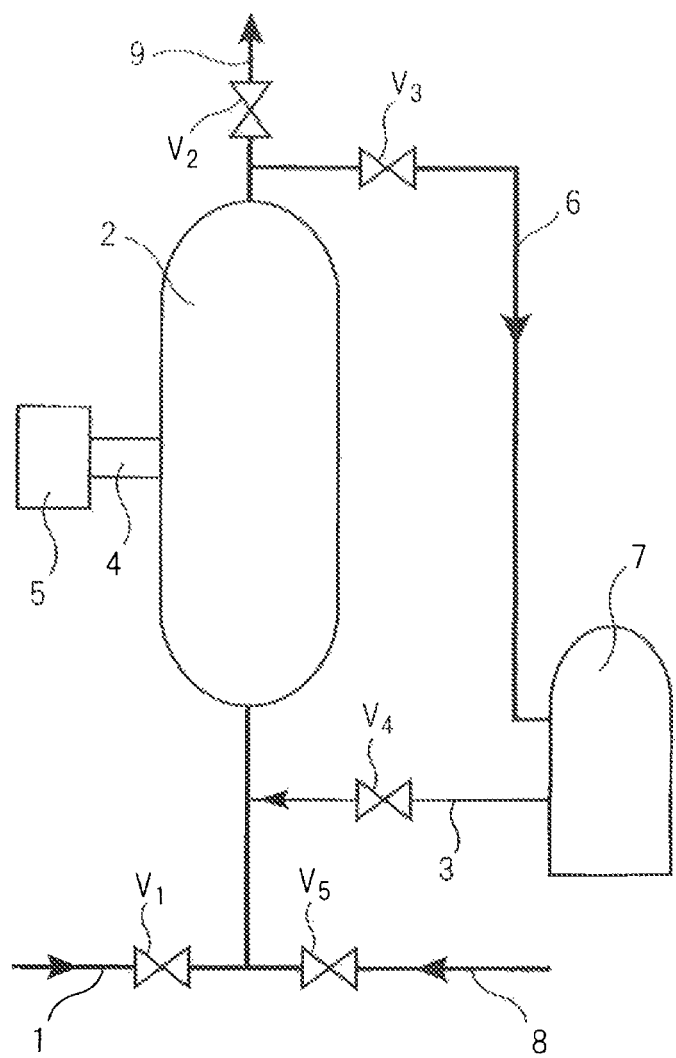
FIG. 1 is an explanatory view showing an example of an apparatus for implementing a method of capturing carbon dioxide of the present invention.

Hereinafter, preferred embodiments of the present invention are described.

An adsorbent used in the present invention is a substance that effectively generates heat by a dielectric loss effect or a conductive loss effect by absorbing microwaves, in the adsorbents having a carbon dioxide adsorption capacity.

For example, activated carbon and activated cokes, and a clay compound, such as zeolite, activated alumina, and montmorillonite are used as the adsorbent. In particular, it is preferable that the adsorbent include at least one of crystalline zeolite having high absorptive capacity for carbon dioxide (A-type, X-type, Y-type, and mordenite (MOR)-type) and activated carbon. Further, it is more preferable that the adsorbent be crystalline zeolite (molecular sieve 13X (MS-13X) expressed by a chemical formula, $Na_{86}[(AlO_2)_{86}(SiO_2)_{106}].276H_2O$. The crystalline zeolite adsorbs a large amount of carbon dioxide and easily absorbs a microwave, such that it is effective as an adsorbent. It may be possible to use, for example, powder having an average particle diameter of 0.5 to 50 µm, as the adsorbent. Further, it is preferable that the average particle diameter of the adsorbent be 1 to 10 µm in order to contact the iron oxide nanoparticles with higher efficiency.

A hybrid adsorbent prepared by mixing the adsorbent described above with the iron oxide nanoparticles is used in the present invention. The iron oxide nanoparticles mixed in the adsorbent includes at least one of magnetite ($Fe_3O_4$), hematite ($Fe_2O_3$), and wustite (FeO). In particular, it is more preferable that the iron oxide nanoparticles be magnetite having a magnetic property. The magnetite is efficiently heated because it easily absorbs a microwave. Further, since the wustite is a nonstoichiometric compound, the ratio of Fe and O is not accurately 1:1.

The technical term of "hybrid adsorbent" used herein is an adsorbent that is obtained by mixing an adsorbent, such as zeolite described above, with the iron oxide nanoparticles described above.

The technical term of "iron oxide nanoparticles" used herein is iron oxide manufactured by, for example, a PVS (Physical Vapor Synthesis) method. The iron oxide has an average particle diameter of about 20 to 100 nm.

Further, the iron oxide nanoparticles in the hybrid adsorbent has a particle diameter of 10 to 500 nm. It is preferable that the iron oxide nanoparticles in the hybrid adsorbent have an average particle diameter of 20 to 200 nm. More preferably, the average particle diameter of the iron oxide nanoparticles is 20 to 100 nm. It may be possible to bring the iron oxide nanoparticles in contact with an adsorbent, for example, having an average particle diameter of about 0.5 to 50 μm with high efficiency. Therefore, heat is effectively transferred to the adsorbent from the iron oxide nanoparticles increased in temperature by absorbing microwaves. Further, when a commercial iron oxide reagent having an average particle diameter of about 3 μm is mixed in an adsorbent, the heat transfer described above does not sufficiently occur. It is preferable that the mixing amount (blending amount) of the iron oxide nanoparticles in the hybrid adsorbent be 0.1 to 50 mass %. When the amount of the mixed iron oxide nanoparticles is 0.1 mass % or more, heat can be sufficiently transferred from the iron oxide nanoparticles to the adsorbent. Further, when the amount of the mixed iron oxide nanoparticles is 50 mass % or less, it is possible to sufficiently ensure the amount of adsorbed carbon dioxide by the adsorbent. More preferably, the amount of the mixed iron oxide nanoparticles is 2 to 30 mass %. In this case, the balance between the amount of heat transfer and the amount of adsorbed carbon dioxide is optimized, such that it is possible to more efficiently capture the carbon dioxide. Further, it is preferable that the amount of the mixed adsorbent in the hybrid adsorbent be 50 to 99.9 mass % in order to sufficiently ensure the amount of adsorbed carbon dioxide. In addition, the hybrid adsorbent may be used in powder. However, similar to commercial adsorbents, it is preferable to agglomerate (form) the hybrid adsorbent in a sphere shape or a pellet shape of about 2 to 5 mm, using a bonding material, such as clay, in accordance with the flow rate of a gas to suppress a pressure loss. Further, the amount of the bonding material is estimated as an amount not included in the amount of the hybrid adsorbent.

A commercial iron oxide reagent can be manufactured by a liquid phase method. For example, an iron oxide reagent is manufactured using the following method. That is, a cloudy liquid containing iron hydroxide is obtained by adding alkali into iron sulfate aqueous solution. An iron oxide precipitate is obtained by blowing an oxidizing gas into the cloudy liquid and oxidizing the iron hydroxide. It is possible to manufacture an iron oxide reagent by drying the precipitate after filtering. Meanwhile, the iron oxide nanoparticles is manufactured, for example, by a PVS (Physical Vapor Synthesis) method. That is, molecules and clusters of iron oxide are formed by creating vapor of iron atoms by heating metallic iron of a raw material and bringing the vapor in contact with an oxygen gas. The iron oxide nanoparticles is formed by instantly cooling the iron oxide in order to control the average particle diameter at about 20 nm, for example. Therefore, the iron oxide nanoparticles is manufactured by a manufacturing method completely different from commercial iron oxide reagents. Accordingly, the average particle diameter (diameter) of the iron oxide nanoparticles is smaller than the average particle diameter of commercial iron oxide reagents by one to two orders of magnitude.

Hereinafter, a preferred embodiment of a method of capturing carbon dioxide, using the hybrid adsorbent of the present invention is described in detail with reference to the accompanying drawings.

In an embodiment of the present invention, for example, carbon dioxide is captured by repeating an adsorbing process, a cleaning process, a desorbing process, and a cooling process, using an apparatus for capturing shown in FIG. 1.

Selector valves V1 and V2 are open while selector valves V3 to V5 are closed in the adsorbing process. In the adsorbing process, a dehumidified carbon dioxide-containing gas is introduced into a packed layer (not shown) filled with the hybrid adsorbent in an adsorption tower 2 through a passage 1. In the adsorption tower 2, carbon dioxide is adsorbed preferentially to other gases and non-adsorbed gas is discharged through a passage 9. A passage 6 is closed in the adsorbing process.

In the cleaning process, a passage 1 is switched to a passage 3 by closing the selector valve V1 and opening the selector valve 4 when the hybrid adsorbent in the adsorption tower 2 sufficiently adsorbs carbon dioxide. Further, some of the captured carbon dioxide is supplied from a product tank 7 into the adsorption tower 2 as a carrier gas and impurity components, such as nitrogen, remaining in the adsorption tower 2 are discharged from a passage 9.

The passage 9 is switched to the passage 6 by closing the selector valve V2 and opening the selector valve V3 in the desorbing process. With the passage 3 and the passage 6 open, microwaves are irradiated to the hybrid adsorbent in the adsorption tower 2 from a microwave generator 5, through a waveguide 4 connected to the adsorption tower 2. As the microwaves are irradiated to the hybrid adsorbent, heat is generated from the inside of the hybrid adsorbent by the dielectric loss effect or the conductive loss effect, such that rapid and uniform heating occurs. As a result, the carbon dioxide adsorbed to the hybrid adsorbent is efficiently desorbed from the hybrid adsorbent. The carbon dioxide that has been desorbed is captured into the product tank 7 through the passage 6 (though the passage 9 is closed).

The passage 6 is switched to the passage 9 by opening again the selector valve V2 and closing the selector valve V3 in the cooling process. Further, the passage 3 is switched to the passage 8 by closing the selector valve V4 and opening the selector valve V5. Further, the hybrid adsorbent after the carbon dioxide is desorbed is cooled by introducing a cooling gas, such as dry nitrogen or air, from the passage 8.

After the cooling process, the passage 8 is switched to the passage 1 by closing the selector valve V5 and opening the selector valve V1. Carbon dioxide is adsorbed (adsorbing process) by re-introducing a carbon dioxide-containing gas into the adsorption tower 2 through the passage 1. As described above, the adsorbing process, cleaning process, desorbing process, and cooling process are repeated.

An example including one adsorption tower 2 was described in the above in order to simply describe the process of separating and capturing carbon dioxide. However, in general, two to four adsorption towers are disposed in series and carbon dioxide is continuously separated and capturing by controlling the timings of adsorbing and desorbing.

Figure 2:
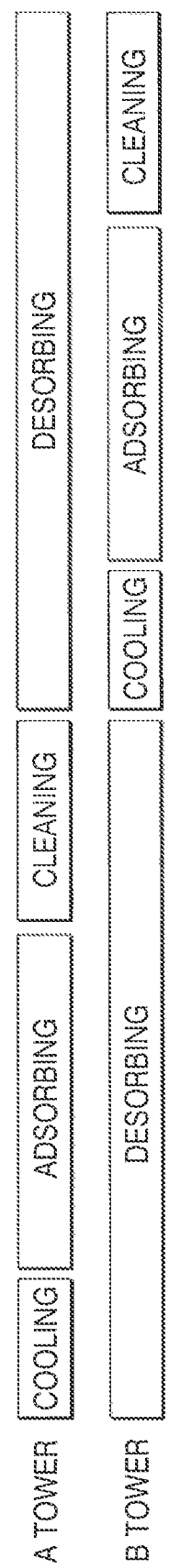
FIG. 2 is an example of a time schedule when two adsorption towers are used.

FIG. 2 shows an example of a time schedule when two adsorption towers are used. In the schedule example, while a cooling process, an adsorbing process or a cleaning process (discharging impurity components) is performed in a tower A, a desorbing process (irradiating a microwave) is performed in a tower B. Further, while the desorbing process (irradiating a microwave) is performed in the tower A, the cooling process, adsorbing process, or cleaning process (discharging impurity components) is performed in the tower B. As described above, it is possible to continuously separate and capture carbon dioxide (desorbing process). In general, since the adsorption time is shorter than the desorption time, there may be a time where it is impossible to adsorb carbon dioxide when capturing carbon dioxide from a continuously discharged gas, such as a combustion exhaust gas. In this case, a gas holder is disposed ahead of the adsorption tower (in the upstream position of the gas flow) to adjust the gas introduction time.

Moreover, it is possible to more smoothly and continuously separate and capture carbon dioxide by disposing three or more adsorption towers in series and switching the passages of the processes (for example, the adsorbing process or the desorbing process).

The method of the present invention can be applied to any gas as long as the gas contains carbon dioxide. In particular, it can be appropriately applied to a gas containing carbon dioxide at relatively high concentration, such as a combustion exhaust gas of a coal-fired plant (concentration of carbon dioxide: about 15 vol. %), a blast furnace gas (BFG) (concentration of carbon dioxide: about 20 vol. %), and an air-heating furnace exhaust gas (concentration of carbon dioxide: about 25 vol. %).

In the physical adsorption method, the higher the concentration of carbon dioxide, the more carbon dioxide is adsorbed to the adsorbent, such that it is possible to suppress the specific energy consumption for capturing carbon dioxide at a low level. Therefore, it is preferable that the concentration of carbon dioxide in a gas be 10 vol. % or more. For example, a BFG containing high-concentration carbon dioxide (about 20 vol. %) or an air-heating furnace exhaust gas of a blast furnace (about 25 vol. %) is ideal. When the concentration of carbon dioxide is under 10 vol. %, the amount of adsorbed carbon dioxide per mass of the adsorbent significantly decreases, such that a large amount of adsorbent is required. Therefore, it is not economically preferable to capture carbon dioxide from a gas containing carbon dioxide at a concentration under 10 vol. %.

Further, since vapor has a strong polarity and interferes with adsorption of carbon dioxide, it is preferable to remove moisture in advance, when vapor at a high concentration (for example, several vol. % to tens of vol. %) is contained in a carbon dioxide-containing gas. Since the affinity between an adsorbent and the vapor is different, depending on the kinds of adsorbents, it is required to change the degree of dehumidification in accordance with the kinds of adsorbents. For example, since a zeolite-based adsorbent (zeolite) has strong affinity with vapor, it is required to remove moisture to a dew point of about $-40°$ C. to $-60°$ C. Further, for example, since affinity between an activated carbon-based adsorbent (activated carbon) and vapor is weak, dehumidification may be performed to a dew point of about $10°$ C. to $20°$ C. In addition, it is preferable to thy the hybrid adsorbent in advance before introducing a gas into the adsorption tower in order to adsorb more carbon dioxide to the hybrid adsorbent and increase the microwave absorption ratio to the hybrid adsorbent. For example, it is possible to remove moisture by irradiating microwaves for heating while supplying a dehumidified gas to the adsorbent. It is possible to determine that drying is sufficiently performed in advance by disposing a hygrometer at the outlet of the adsorption tower (in the downstream position of the gas flow) and ascertaining that the humidity of the outlet gas is decreased and stabilized with the hygrometer.

For the frequency of the microwave, a frequency within a wide range of 300 MHz to 300 GHz may be used. However, when the microwaves are actually used, the band is limited by regulations regarding communication. That is, in detail, a frequency of 2,450 MHz or 915 MHz is used in Japan. Further, a frequency of 5,800 MHz may be used in America.

The waveguide 4 is one tube in the above description (FIG. 1). However, it may be possible to dispose a plurality of waveguides 4 in the adsorption tower in accordance with the shape and dimensions of the packed layer. Further, when the width of the packed layer is large (the diameter is large when the packed layer is a cylinder), it may be possible to dispose a plurality of waveguides 4 in the circumferential direction of the packed layer, or it may be preferable to dispose a plurality of waveguides 4 in the length direction of the packed layer when the packed layer is long.

The packed layer may have any shape. When the shape of the packed layer is a polygonal cylinder or a circular cylinder, it is preferable that the inner circumference of the adsorption tower be 31.4 cm or less (the inner diameter of the adsorption tower is 10 cm or less when the shape of the packed layer is a circular cylinder). Further, it is more preferable that the inner circumference of the adsorption tower is 15.7 cm or less (the inner diameter of the adsorption tower is 5 cm or less when the shape of the packed layer is a circular cylinder). When the inner circumference of the adsorption tower is more than 31.4 cm, the microwaves have difficulty in reaching the center of the packed layer and the inside of the packed layer is not uniformly heated.

In addition, when the inner circumference of the adsorption tower is small, the heat removal area of the packed layer per filling amount is small, such that heat is not sufficiently removed (discharged) when the microwaves are irradiated and a long time is taken for cooling. Therefore, the lower limit of the inner circumference of the adsorption tower is determined from the dimensions of the hybrid adsorbent. For example, when a hybrid adsorbent formed in a spherical shape having a diameter of 0.2 cm is used, the cylindrical packed layer needs to have a diameter (1 cm) about 5 times the diameter of the adsorbent, such that the minimum inner circumference of the adsorption tower is 3.14 cm. The smaller the inner circumference of the adsorption tower, the more the filling amount per length of the packed layer decreases, such that it is necessary to increase the length of the packed layer. However, since the pressure loss increases when the packed layer is long, it is preferable to dispose a plurality of short packed layers. Further, the lower limit of the inner circumference of the adsorption tower is not determined from irradiation efficiency of microwaves and heat removal efficiency.

Since the adsorption is an exothermal reaction, the lower the adsorption temperature in the adsorption tower, the greater the adsorption rate and adsorption amount of carbon dioxide increase. However, considering the economic efficiency, it is preferable that the adsorption temperature be room temperature. The adsorption time is comprehensively determined from the performance of the hybrid adsorbent or the number of adsorption towers. Unlike adsorption, the higher the desorption temperature, the more the desorption rate and desorption amount increase. However, at a high temperature of $500°$ C. or more, particularly at $600°$ C. or more, in the hybrid adsorbent containing the zeolite-based adsorbent (zeolite), the fine pores of the zeolite may be broken and a long time is required for cooling. Therefore, it is preferable to efficiently perform desorption at as a low temperature as possible.

It is possible to use a fiber-optic thermometer that is not influenced by an electromagnetic field by irradiation of a microwave in order to measure the temperature.

Since the temperature of the packed layer rapidly increases when the microwaves are continuously irradiated, it is difficult to control the rate of temperature increase. Therefore, the adsorbent is directly heated while the rate of temperature increase is controlled by intermittently irradiating the microwaves. In this method, it is possible to perform desorption at a relatively low temperature without increasing the atmospheric temperature. The microwaves are alternately irradiated and stopped when the microwaves are intermittently irradiated. In detail, for example, irradiating microwaves for 30 seconds and stopping irradiation of microwaves for 30 seconds are alternately repeated five times. The desorption time, the irradiation time of a microwave, and the interval of irradiation are comprehensively determined from the performance of the adsorbent or the microwave output, and the arrangement of the waveguides.

Further, the outer wall of the adsorption tower which houses the hybrid adsorbent is made of any one of $SiO_2$, MgO, $Si_3N_4$, AlN, and BN. The substances do not independently absorb microwaves (temperature is not increased by irradiation of a microwave) while having relatively high thermal conductivity (they can be easily cooled when being heated). Therefore, it is possible to allow the microwaves to be efficiently absorbed into the adsorbent using the above substances for the absorption tower. For example, as for $SiO_2$, fused quartz may be used. Further, for example, as for MgO, $Si_3N_4$, AlN, and BN, a refractory manufactured by sintering after forming the substances may be used.

In addition, for example, it is possible to desorb carbon dioxide while suppressing temperature increase of the packed layer with improved discharge of heat by disposing protrusions on the outer wall of the adsorption tower. It is preferable that the protrusion be in a fin shape, a cylindrical shape, or a conical shape in order to increase the outer surface area.

In the present invention, carbon dioxide in a gas is adsorbed to the hybrid adsorbent prepared by mixing an adsorbent with iron oxide nanoparticles. Further, the carbon dioxide after being adsorbed is desorbed from the hybrid adsorbent by irradiating microwaves to the hybrid adsorbent, and the desorbed carbon dioxide is captured.

Since the adsorbent is heated by convection heat transfer from the atmospheric gas to the adsorbent in the conventional techniques, such as indirect external heating from the outside of the outer wall or internal heating by a heated flow gas, it is impossible to discharge heat from the adsorbent during heating. In microwave heating, since the hybrid adsorbent itself generates heat, it is possible to discharge heat from the surface of the adsorbent to the atmospheric gas and the outside. In the present invention, the iron oxide nanoparticles in the hybrid adsorbent absorbs more microwaves, and the efficiency is further improved, as compared with when an adsorbent is used alone.

EXAMPLE

Comparative Example 1

A gas mixture of carbon dioxide of 20 vol. % and nitrogen of 80 vol. % was used as a model gas of a blast furnace gas and an air-heating furnace exhaust gas. Further, molecular sieve 13X (MS-13X) that is commercially available zeolite was used as an adsorbent in order to capture the carbon dioxide from the gas mixture. In order to ensure the effect of mixing iron oxide nanoparticles with an adsorbent, which is described below, the adsorbent was formed without using a binder, such as clay, and then crushed and sieved, thereby preparing an adsorbent sample. The adsorbent sample of 40 g was filled in a quartz pipe, the gas mixture was supplied into the quartz pipe at a flow rate of 2 L/min, and the carbon dioxide in the gas mixture was adsorbed on the adsorbent at about 40° C. until the saturated adsorption is reached. While the carbon dioxide is adsorbed on the adsorbent, the concentration of the carbon dioxide in the exhaust gas from the quartz pipe reduces to under 20 vol. %. When the carbon dioxide is adsorbed on the adsorbent until the saturated adsorption is reached, the concentration of the carbon dioxide in the exhaust gas returns to 20 vol. %. Accordingly, the concentration of the carbon dioxide in the exhaust gas was measured and saturated adsorption was determined from the change in concentration of the carbon dioxide, which is described above. The amount of the adsorbed carbon dioxide can be acquired by accumulating the reduction amount of the measured concentration of the carbon dioxide until the concentration of the carbon dioxide becomes stable at 20 vol %. The amount of the adsorbed carbon dioxide (the amount of adsorbed $CO_2$) was estimated as adsorption ratio (mass %) of the carbon dioxide. That is, the adsorption ratio of the carbon dioxide is calculated by dividing the mass of the adsorbed carbon dioxide by the mass of the adsorbent. Thereafter, the adsorbed carbon dioxide was desorbed from the adsorbent by irradiating microwaves at 2,450 MHz and 200 W to the adsorbent for 2 minutes while supplying the gas mixture to the quartz pipe. While measuring the concentration of the carbon dioxide in the exhaust gas, the amount of desorbed carbon dioxide was acquired by accumulating the differences (the increase in concentration of carbon dioxide) between 20 vol %. and the measured values of the concentration of the carbon dioxide until the concentration of the carbon dioxide became stable at 20 vol. %. The amount of the desorbed carbon dioxide (desorption ratio of $CO_2$) was estimated as a desorption ratio (%). The desorption ratio is calculated by dividing the mass of the desorbed carbon dioxide by the mass of the adsorbed carbon dioxide. Further, the specific energy consumption E is calculated by the following Formula (I).

$$E = P \times t/60/k_p/Nx \qquad (1)$$

where microwave irradiation power P is 200 W and microwave irradiation time is 2 min. Further, a coefficient $k_p$ for converting the microwave irradiation power into the used power is 0.7. Nx is the mass (g) of the desorbed carbon dioxide. In addition, the temperature of the adsorbent was measured by thermocouples.

In Comparative Example 1, the carbon dioxide is desorbed from the MS-13X by adsorbing the carbon dioxide only to the MS-13X and heating the MS-13X with the microwaves. As a result, as shown in Table 1, the desorption ratio of the carbon dioxide was 21.5 and the specific energy consumption was 8.7 kWh/kg-$CO_2$.

Example 1

Next, adsorption and desorption of carbon dioxide were performed under the same conditions as Comparative Example 1, except for using a hybrid adsorbent prepared by mixing magnetite ($Fe_3O_4$) nanoparticles of 2.5 mass %, which has an average particle diameter of 80 nm with molecular sieve 13X, as an adsorbent. Further, the magnetite ($Fe_3O_4$) nanoparticles were prepared by the PVS (Physical Vapor Synthesis) using plasma. As a result, as shown in Table 1, the desorption ratio of the carbon dioxide of Example 1 was 28.6%, which could be improved more than the desorption ratio of Comparative Example 1. In addition, the specific energy consumption of Example 1 was 7.3 kWh/kg-$CO_2$, which was decreased more than the specific energy consumption of Comparative Example 1.

Example 2

Adsorption and desorption of carbon dioxide were performed under the same conditions as Example 1, except for setting the amount of mixed magnetite ($Fe_3O_4$) nanoparticles in a hybrid adsorbent at 5.0 mass %. As a result, as shown in Table 1, the highest achieved temperature (maximum temperature) of the hybrid adsorbent of Example 2 increased up to 64° C. from 55° C. in Comparative Example 1 and Example 1. Therefore, it was possible to further improve the desorption ratio of the carbon dioxide at 32.1% in Example 2, higher than the desorption ratio of Example 1. Further, the specific energy consumption of Example 2 was 5.8 kWh/kg-$CO_2$, which was decreased more than the specific energy consumption of Example 1.

Example 3

Adsorption and desorption of carbon dioxide were performed under the same conditions as Example 1, except for setting the amount of mixed magnetite ($Fe_3O_4$) nanoparticles in a hybrid adsorbent at 10 mass %. As a result, as shown in Table 1, the highest achieved temperature (maximum temperature) of the hybrid adsorbent of Example 3 increased up to 75° C. from 55° C. in Comparative Example 1 and Example 1. Therefore, it was possible to further improve the desorption ratio of the carbon dioxide at 33.2% in Example 3, higher than the desorption ratio of Example 2. Further, the specific energy consumption of Example 3 was 5.4 kWh/kg-$CO_2$, which was decreased more than the specific energy consumption of Example 2.

Example 4

Adsorption and desorption of carbon dioxide were performed under the same conditions as Example 1, except for setting the amount of mixed magnetite ($Fe_3O_4$) nanoparticles in a hybrid adsorbent to 15 mass %. As a result, as shown in Table 1, the highest achieved temperature (maximum temperature) of the hybrid adsorbent of Example 4 increased up to 90° C. from 55° C. in Comparative Example 1 and Example 1. Therefore, it was possible to further improve the desorption ratio of the carbon dioxide at 36.6% in Example 4, higher than the desorption ratio of Example 3. Further, the specific energy consumption of Example 4 was 5.0 kWh/kg-$CO_2$, which was decreased more than the specific energy consumption of Example 3.

Example 5

Adsorption and desorption of carbon dioxide were performed under the same conditions as Example 1, except for setting the amount of mixed magnetite ($Fe_3O_4$) nanoparticles in a hybrid adsorbent at 20 mass %. As a result, as shown in Table 1, the highest achieved temperature (maximum temperature) of the hybrid adsorbent of Example 5 increased up to 121° C. from 55° C. in Comparative Example 1 and Example 1. Therefore, it was possible to further improve the desorption ratio of the carbon dioxide at 42.9% in Example 5, higher than the desorption ratio of Example 4. Further, the specific energy consumption of Example 5 was 4.7 kWh/kg-$CO_2$, which was decreased more than the specific energy consumption of Example 4.

Example 6

Adsorption and desorption of carbon dioxide were performed under the same conditions as Example 2, except for using a hybrid adsorbent prepared by mixing hematite ($Fe_2O_3$) nanoparticles of 5.0 mass, which has an average particle diameter of 40 nm, with molecular sieve 13X, as an adsorbent. Further, the hematite ($Fe_2O_3$) nanoparticles were prepared by the PVS (Physical Vapor Synthesis) using plasma. As a result, as shown in Table 1, the desorption ratio of the carbon dioxide in Example 6 was improved more than the desorption ratio of Comparative Example 1, but was not improved as much as the desorption ratio of Example 2. Further, the specific energy consumption of Example 6 was decreased more than the specific energy consumption of Comparative Example 1, but was not decreased as much as the specific energy consumption of Example 2.

Comparative Example 2

Adsorption and desorption of carbon dioxide were performed under the same conditions as Comparative Example 1, except for increasing the irradiation time of microwaves and making the highest achieved temperature (maximum temperature) of the adsorbent 64° C., which is the same as that of Example 2. Only the molecular sieve 13X was used as the adsorbent in Comparative Example 2. As a result, as shown in Table 1, the highest achieved temperature of Comparative Example 2 increased more than the highest achieved temperature of Comparative Example 1 and the desorption ratio of the carbon dioxide was improved more than the desorption ratio of Comparative Example 1. However, the rate of increase of the input energy to the increase in the desorption ratio increases, such that the specific energy consumption of Comparative Example 2 increased more than the specific energy consumption of Comparative Example 1 and Example 2. Therefore, it was found that the hybrid adsorbent mixed with iron oxide nanoparticles has the effect of desorbing carbon dioxide by heating with the microwaves.

Comparative Example 3

Adsorption and desorption of carbon dioxide were performed under the same conditions as Example 2, except for using a hybrid adsorbent prepared by mixing molecular sieve 13X with a commercial magnetite ($Fe_3O_4$) reagent (about 3 μm of average particle diameter, Extra pure, Kanto Chemical Co.), as an adsorbent. As a result, as shown in Table 1, the desorption ratio of the carbon dioxide and the specific energy consumption of Comparative Example 3 were both deteriorated, as compared with Examples 2 and 3 in which the iron oxide nanoparticles of the same mass as Comparative Example 3 were mixed. It can be seen from the result that it is possible to efficiently improve the desorption ratio and reduce the specific energy consumption by mixing not the iron oxide reagent, but the iron oxide nanoparticles into the adsorbent.

TABLE 1

|  | Comparative Example 1 | Example 1 | Example 2 | Example 3 | Example 4 | Example 5 | Example 6 | Comparative Example 2 | Comparative Example 3 |
| --- | --- | --- | --- | --- | --- | --- | --- | --- | --- |
| Type of iron oxide | None | $Fe_3O_4$ Nanoparticles | $Fe_3O_4$ Nanoparticles | $Fe_3O_4$ Nanoparticles | $Fe_3O_4$ Nanoparticles | $Fe_3O_4$ Nanoparticles | $Fe_2O_3$ Nanoparticles | None | $Fe_3O_4$ commercial reagent |
| Amount of mixed iron oxide (mass %) | — | 2.5 | 5.0 | 10.0 | 15.0 | 20.0 | 5.0 | — | 5.0 |
| Adsorption ratio of $CO_2$ (mass %) | 12.7 | 12.8 | 12.8 | 13.3 | 13.0 | 11.7 | 12.5 | 12.7 | 13.2 |

TABLE 1-continued

| | Comparative Example 1 | Example 1 | Example 2 | Example 3 | Example 4 | Example 5 | Example 6 | Comparative Example 2 | Comparative Example 3 |
|---|---|---|---|---|---|---|---|---|---|
| Maximum temperature (° C.) | 55 | 55 | 64 | 75 | 90 | 121 | 61 | 64 | 68 |
| Desorption ratio of $CO_2$ (%) | 21.5 | 28.6 | 32.1 | 33.2 | 36.6 | 42.9 | 32.0 | 27.5 | 28.4 |
| Specific energy consumption (kWh/kg-$CO_2$) | 8.7 | 7.3 | 5.8 | 5.4 | 5.0 | 4.7 | 6.6 | 10.2 | 7.4 |

The mass of adsorbent is 40 g.
Microwave irradiation condition are as follows: 2450 MHz, 200 W, and 2 min (3 min in Comparative Example 2).

INDUSTRIAL APPLICABILITY

It is possible to provide a method of capturing carbon dioxide in a gas, which can reduce energy consumption in comparison to the conventional techniques, when desorbing carbon dioxide from an adsorbent in a physical adsorption method.

REFERENCE SYMBOL LIST

1: PASSAGE
2: ADSORPTION TOWER
3: PASSAGE
4: WAVEGUIDE
5: MICROWAVE GENERATOR
6: PASSAGE
7: PRODUCT TANK
8: PASSAGE
9: PASSAGE

What is claimed is:

1. A method of capturing a carbon dioxide in a gas, the method comprising:
    adsorbing the carbon dioxide in the gas on a hybrid adsorbent in which a mixing amount of iron oxide nanoparticles is 0.1 to 30 mass %, the hybrid adsorbent containing an adsorbent that adsorbs carbon dioxide and the iron oxide nanoparticles that have an average particle diameter of 10 to 100 nm;
    irradiating microwaves to the hybrid adsorbent and desorbing the carbon dioxide adsorbed on the hybrid adsorbent, from the hybrid adsorbent;
    capturing the carbon dioxide desorbed from the hybrid adsorbent; and
    cooling the hybrid adsorbent.

2. The method of capturing the carbon dioxide in the gas according to claim 1, wherein the average particle diameter of the iron oxide nanoparticles is 20 to 100 nm.

3. The method of capturing the carbon dioxide in the gas according to claim 1, wherein
    an average particle diameter of the adsorbent is 0.5 to 50 μm.

4. The method of capturing the carbon dioxide in the gas according to claim 1, wherein
    the iron oxide nanoparticles contain at least one of magnetite, hematite, and wustite.

5. The method of capturing the carbon dioxide in the gas according to claim 4, wherein
    the iron oxide nanoparticles are magnetite.

6. The method of capturing the carbon dioxide in the gas according to claim 1, wherein
    the adsorbent contains at least one of activated carbon and crystalline zeolite.

7. The method of capturing the carbon dioxide in the gas according to claim 6, wherein
    the adsorbent is crystalline zeolite expressed by a chemical formula, $Na_{86}[(AlO_2)_{86}(SiO_2)_{106}] \cdot 276H_2O$.

8. The method of capturing the carbon dioxide in the gas according to claim 1, wherein
    the hybrid adsorbent is formed by a bonding material and used.

9. An apparatus for capturing a carbon dioxide in a gas, the apparatus comprising:
    a first passage in which the gas containing the carbon dioxide is introduced;
    an adsorption tower which has a packed layer filled with a hybrid adsorbent in which a mixing amount of iron oxide nanoparticles is 0.1 to 30 mass %, the hybrid adsorbent containing an adsorbent that adsorbs carbon dioxide and the iron oxide nanoparticles that have an average particle diameter of 10 to 100 nm;
    a microwave generator which irradiates microwaves to the hybrid adsorbent;
    a product tank in which the carbon dioxide is captured; and
    a second passage in which a cooling gas cooling the hybrid adsorbent is introduced.

* * * * *